Patented Jan. 6, 1948

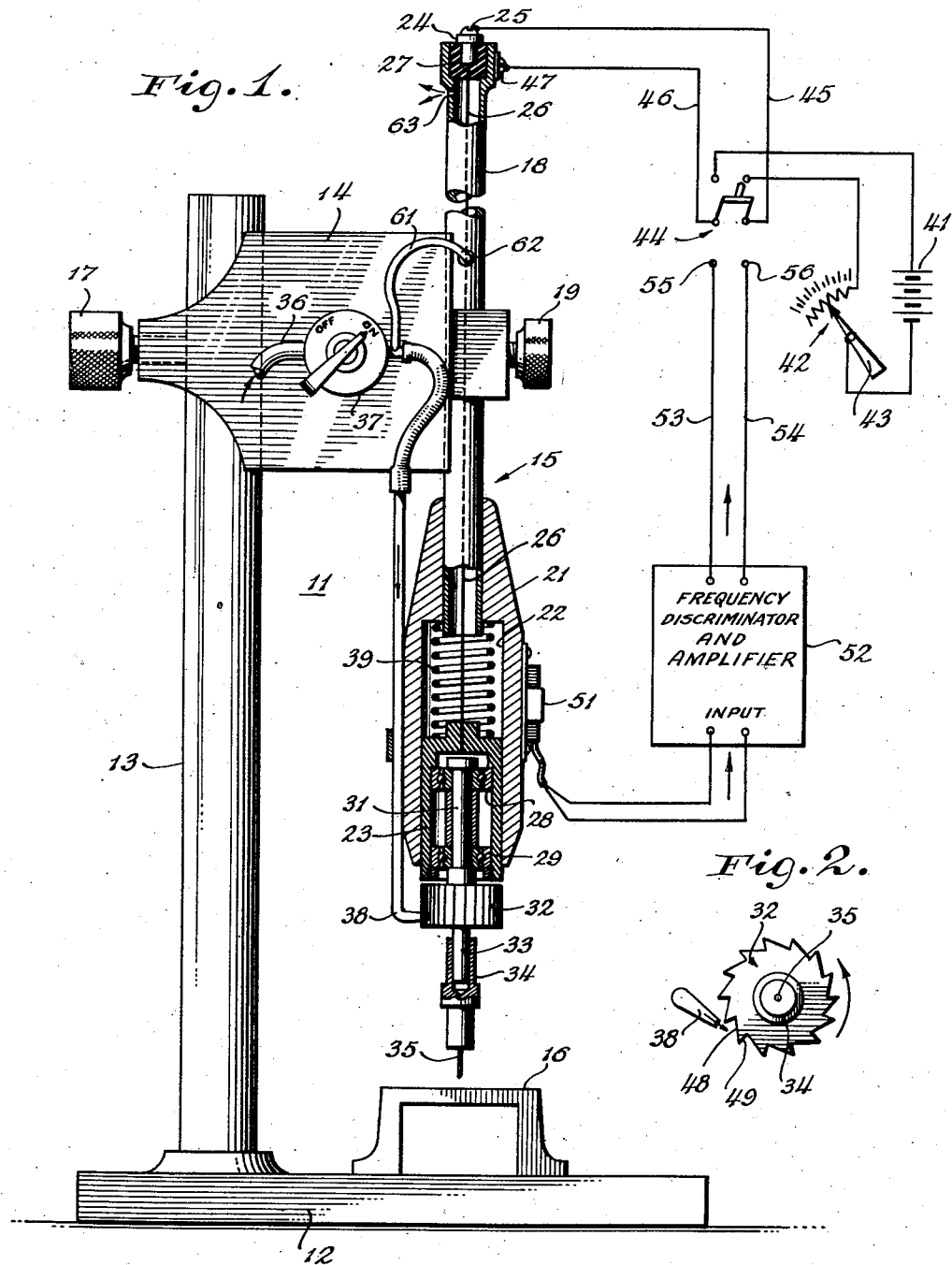

2,433,874

UNITED STATES PATENT OFFICE 2,433,874

MACHINE-TOOL APPARATUS

Sigurd F. Varian, Garden City, N. Y., assignor to Sperry Gyroscope Company, Inc., a corporation of New York Application December 14, 1944, Serial No. 568,091

11 Claims. (Cl. 77—32)

1

The present invention relates to control of feed of machine tools, such as drills and other rotary- or recurrent-motion cutting tools. The invention is particularly concerned with accurate feed control of miniature drills and the like.

Apparatus used for drilling holes in bodies of metal or other material usually embodies a high-speed rotary drill arbor which may be moved downward toward the "work," or material to be drilled, by means of a control member so connected to the arbor as to give the operator a great mechanical advantage. With such an arrangement, the movement of a control lever through a distance of several inches usually produces a downward movement of a drill arbor through a distance of a fraction of an inch. Such mechanical leverage sometimes proves helpful in some respects for tool feed control, but produces a disadvantageous effect in that the operator, by applying a very slight force to the control lever, may bring excessive force to bear on the drill or other cutting tool, and thus may break the tool or may damage the cutting edge thereof by overheating.

Furthermore, it is difficult to construct a drill press in such a way as to provide great leverage or mechanical advantage with positive, backlash-free response of the cutting tool to small changes of force exerted on the control lever.

Accordingly, it is an object of the present invention to provide improved machine tool and feed control apparatus.

Another object is to provide tool feed control apparatus free of backlash and accurately responsive to movements of a control lever.

A further object is to provide machine tool apparatus combining accurate and dependable feed control with a cutting tool driving arrangement of poor speed regulation characteristics, so that small changes of load of the cutting tool result in relatively large changes of speed thereof, and the feed control may be governed accordingly.

Still another object is to provide a combination machine tool feed system and driving arrangement of such character that mechanical interaction of the feed and drive elements is minimized.

Another object is to provide a simple electrical control system for accurate tool feed control.

Yet another object is to provide automatic tool feed control responsive to tool load variation for regulating the feed to minimize such variation.

In accordance with the present invention, a thermally expansible member is incorporated in a machine tool apparatus in such a way that expansion or contraction of the member varies the relative position of a cutting tool, illustrated as a miniature drill, and the material or "work" to be operated upon by the tool or drill. A source of electric power and a suitable electric control device are coupled to the thermally expansible member for controlling the dimensions thereof and, accordingly, the relative positions of the cutting tool or drill and the work.

A fluid turbine, e. g. a compressed air turbine, may be incorporated for driving the cutting tool or drill, and may be so arranged as to permit appreciable axial displacement of the turbine rotor and stator elements with uniform operation of the turbine, and to provide wide variation of drill rotation speed effected by slight changes of drill load torque.

An operator may manipulate the electric control device according to aurally detected changes of pitch of the whine or sound accompanying speed changes of the tool, or an automatic feed control may be provided with a frequency discriminator for varying the electric power applied to the thermally expansible member in accordance with the vibration frequency of the drill arbor.

The above objects and brief description of the present invention will be made clearer and other objects will be made apparent by the following detailed description taken in conjunction with the drawing, wherein:

Fig. 1 illustrates an embodiment of the present invention; and

Fig. 2 illustrates an end view of the rotor and stator elements of a turbine incorporated in the embodiment shown in Fig. 1.

Referring now to the drawing, a drill press 11 is shown including a base 12 for supporting the work 16, an upright column 13 rigidly attached to base 12, a relatively shiftable cantilever bracket 14 supported by column 13, and a relatively shiftable drill and feed control assembly 15 supported in the cantilever bracket 14. The cantilever bracket 14 is adapted to be moved up or down, or rotated about cylindrical column 13, and to be clamped in any desired position thereon by means of a thumbscrew 17.

The drill and feed control assembly 15 comprises a relatively long tubular member 18 preferably constructed of metal and extending through a suitable passage at the end of the bracket 14, and arranged to be shifted vertically therein as desired and fixedly positioned by means of thumbscrew 19. At its lower end, the tubular member 18 supports a hollow drill bearing housing 21 having an accurately machined cylindrical inner surface 22 for receiving a drill arbor bearing member 23. At its upper end, the tubular member 18 supports a threaded stud 24 bearing a terminal screw 25 and one end of a thermally expansible member 26 which may be a strand of nichrome wire or other material having a relatively high thermal coefficient of expansion. The threaded stud 24 is insulated from the tubular member 18 by an insert 27 of dielectric material such as porcelain.

At is lower end the thermally expansible member 26 is attached to the drill arbor bearing member 23, so that this member is suspended from the threaded stud 24 positioned at the top of the tubular member 18. The drill arbor bearing member 23 slidably fitted within the machined cylindrical inner surface 22 supports, by means of ball bearings 28 and 29, a rotary element including an upper shaft portion 31, a turbine rotor 32, and a tapered lower shaft portion 33. The tapered portion 33 is adapted to receive a chuck or mounting body 34 holding a miniature drill 35. For this purpose, the body 34 is provided with a taper corresponding to that of the lower shaft portion 33, by means of which the assembly 34, 35 may be readily attached to, or detached from, the lower shaft portion 33.

A pneumatic supply hose 36 is arranged for connection to a source of compressed fluid such as air, and is provided with a valve 37 for controlling the feed of driving fluid to a nozzle 38 adapted to provide a high-velocity air jet against the blades of the turbine rotor 32.

A compressed helical spring 39 is provided within the bearing housing 21 and arranged to urge the drill arbor bearing member 23 downward toward the work 16. Accordingly, the spring 39 maintains the expansible member 26 in tension and provides a large force acting against this member to cause penetration of the drill 35 into the work 16.

The lower end of the expansible member 26 is electrically connected by the helical spring 39 to the metal tubular member 18, so that if an electric source is connected between the tubular member 18 and the terminal 24, 25, an electric current is caused to flow through the expansible member 26.

As shown in Fig. 1, an electric source 41 is connected in series with a rheostat or other control device 42 having a manually operated lever 43 for adjustment of the electric power supplied from source 41. A double-pole double-throw switch 44 is provided for connection of the source 41 and controller 42 to the conductors 45 and 46, which in turn, are connected to the terminal screw 25 and a further terminal screw 47 fitted into a tapped hole in conductive tubular member 18.

With the switch 44 connected as described above, the lever 43 may be rotated to control the electrical heating of the thermally expansible member 26, and thereby to control the position of the arbor bearing member 23 and the drill 35 with respect to the work 16. As the lever 43 is rotated in a clockwise direction to increase the power applied to the member 26, the drill 35 is depressed toward the work 16 until it engages the work and the drilling operation is commenced.

This depression or lowering of the drill arbor bearing member 23 and the drill 35 is, of course, accompanied by a lowering or downward axial movement of the turbine rotor 32. Accordingly, the turbine rotor is made to have an appreciable axial dimension, so that the nozzle 38 cooperates equally well with the rotor 32 during movement, up or down, of the rotor 32 over an extent substantially as great as the length of the drill 35.

An important advantage of the turbine system 32, 38 used for rotating the drill 35, in addition to this wide tolerance for feeding or downward movement of the arbor 23 and the turbine rotor 32, is the freedom from appreciable reaction torque on the drill arbor bearing member 23. If a miniature motor such as an electric motor were built into the arbor bearing member 23, and used instead of the turbine 32, 38 to supply rotation power to drill 35, such a motor not only would complicate the structure by the requirement of flexible power-supply connections thereto, but also would exert a reaction torque upon the arbor bearing member 23 equal and opposite to the rotation torque exerted on the drill 35. This freedom from appreciable reaction torque upon the member 23 enables this member to be fitted within the inner surface 22 without any splining or keying to prevent rotation, and thus without any appreciable forces tending to bind the arbor bearing member 23 to the bearing housing 21 and to impede the smooth control of vertical drill feed movement.

Another feature of the fluid turbine 32, 38 is the relatively poor speed regulation of such a driving device, which insures that the rotation speed of the drill 35 varies appreciably for relatively small changes of the load torque of drill 35. Thus, the operator is enabled to regulate the position of the control lever 43 in accordance with variation in the pitch of the whine heard during the high-speed rotation of the drill 35.

As shown in Fig. 2, the nozzle 38 may be directed for the impingement of the air jet against the nearly tangential blade surfaces such as surface 48 instead of the nearly radial blade surfaces such as surface 49, for enhancement of the poor regulation characteristics of the turbine 32, 38.

If desired, a symmetrical or balanced arrangement of rotor drive jets may be provided as by a second nozzle positioned 180° from the nozzle 38 or by the use of three nozzles spaced at 120° intervals around the turbine rotor 32.

If desired, a vibration pick-up 51 may be attached to the housing 21 for producing an alternating electric output signal of a frequency corresponding to the vibration of the housing 21, and therefore corresponding to the pitch of the whine heard during the rotation of the drill 35. The vibration pick-up 51 may be connected to the input terminals of an amplifier and frequency discriminator unit 52, the output terminals of which are connected through conductors 53 and 54 to a pair of terminals 55 and 56 of the double-pole double-throw switch 44. When the movable blades of the switch 44 are swung to the lower position, therefore, for connection with the terminals 55 and 56, the output terminals of the unit 52 are connected to supply variable electric heating power to the thermally expansible member 26.

The frequency discriminator 52 is so arranged as to provide a very strong output signal for input signals of frequency above a predetermined value referred to as the critical frequency and to supply a greatly diminished output voltage for all frequencies appreciably below the predetermined value. Thus, if the frequency discriminator 52 is arranged so that a signal of the critical frequency is supplied by the pickup 51 during the rotation of the drill 35 at the speed corresponding to an optimum load therefor, an intermediate output value is provided by the unit 52 through conductors 53 and 54 and switch 44 to the thermally expansible member 26.

If the member 26 is heated excessively, permitting drill 35 to be fed too fast into the work 16, the reaction torque exerted on the drill 35 by the work 16 is increased and, due to the poor regulation of the turbine 32, 38, the rotation speed of the turbine rotor and the drill 35 rapidly decreases. Accordingly, the vibration signal frequency supplied by the vibration pick-up 51 to the input circuit of the unit 52 decreases and the output signal strength of the unit 52 is rapidly reduced. As a result, the expansible member 26 is quickly cooled, and the drill arbor bearing member 23 and the associated rotary assembly is rapidly retracted against the action of spring 39, withdrawing the drill 35 sufficiently from the work 16 to permit the drill 35 to regain its normal operating speed.

If it is found that the cooling of the thermally expansible member 26 is not satisfactorily rapid in response to a decrease of the electric power applied thereto, an arrangement may be provided for forced-draft cooling of the member 26. For this purpose, a fluid conducting hose 61 is shown leading from an output connection of valve 37 to a coolant inlet opening 62 in the tubular member 18. At the upper end of the tubular member 18, an outlet opening 63 may be provided for the exit of the forced draft of coolant.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Machine tool apparatus comprising a rotary tool, means for rotating said tool about a predetermined axis of rotation, a thermally expansive feed-control member fixedly positioned at one point and connected at another point thereof to said rotary tool, said thermally expansive member being so arranged that the axial feed depth of said tool is dependent upon the dimensions of said member between said fixed point and said connection point, and means for varying the temperature of said member intermediate said fixed point and said connection point during the rotation of said tool whereby the axial feed of said rotary tool is varied accordingly during the machining operation.

2. Machine tool apparatus comprising a cutting tool, a movable bearing member for supporting said cutting tool, means for imparting rapid rotation to said cutting tool within said bearing member, a thermally expansive feed-control member fixedly positioned at one point thereof and connected at another point thereof to said bearing member, said thermally expansive member being so arranged that the axial feed depth of said tool is dependent upon the dimensions of said member between said fixed point and said connection point, and means for gradually varying the temperature of said feed-control member intermediate said fixed point and said connection point during the rapid rotation of said cutting tool whereby the feed of said cutting tool through the work is gradually varied.

3. Machine tool apparatus comprising a cutting tool, a movable bearing member supporting said cutting tool for rotation therewithin, drive means for imparting rotary motion to said cutting tool, feed-control means responsive to an electric potential for moving said bearing member and said cutting tool according to said potential, said feed-control means being so arranged as to provide displacement of said bearing member from an initial position by an extent proportional to a predetermined function of said potential, means for applying a potential to said feed-control means, and means for regulating the magnitude of said potential during the cutting operation to regulate the feed of said cutting tool through the work.

4. Machine tool apparatus comprising a cutting tool, a movable bearing member supporting said cutting tool for rotation therewithin, means for imparting rotary motion to said cutting tool, proportional feed-control means responsive to an electric potential for moving said bearing member and said cutting tool through an extent bearing a predetermined relation to said potential, and means responsive to variation of rotary speed of said cutting tool for applying to said feed-control means a potential varying in magnitude as a gradual function of said rotary speed.

5. Machine tool apparatus comprising a tool, a bearing member supporting said tool for movement therein, driving means for imparting rotation to said tool in said bearing member, means for spacing said bearing member from the material to be operated on by said tool, said spacing means including a thermally expansible member for varying the relative positions of said bearing member and said material, and means for varying the temperature of said thermally expansible member during the rotation of said tool to vary the relative positions of said bearing member and said material during the progress of the tool in the material being operated on by said tool.

6. A drill press comprising a base for fixedly supporting material to be drilled, a bearing housing fixedly supported by said base, a drill arbor bearing member movably fitted in said bearing housing, a rotary element including a turbine rotor and a drill connected thereto borne for rotation by said drill arbor bearing member, a thermally expansible member fixed at a first point with respect to said base and connected at a second point to said drill arbor bearing member, means for varying the temperature of said expansible member to control the movement of said drill arbor bearing member in said housing, and means for directing a fluid jet against said turbine rotor to rotate said drill.

7. A drill press as defined in claim 6, wherein said last-named means comprises a fluid nozzle fixed to said bearing housing.

8. A drill press as defined in claim 6, wherein said thermally expansible member comprises a wire having an appreciable thermal coefficient of expansion, said drill press further including an elastic member urging said drill arbor bearing member away from said first point to maintain said expansible member tensed.

9. A drill press as defined in claim 6, further including means for maintaining a forced flow of coolant along said thermally expansible member to permit rapid control thereof.

10. Machine tool apparatus comprising a cutting tool, a movable bearing member supporting said cutting tool for rotation therewithin, means for imparting rotary motion to said cutting tool, feed-control means responsive to an electric potential for moving said bearing member and said cutting tool according to said potential, and means responsive to variation of rotary speed of said cutting tool for applying to said feed-control means a potential varying according to said rotary speed, said last-named means comprising a vibration pick-up for producing an alternating signal of frequency varying in accordance with the speed of rotation of said cutting tool, and an electrical device including an amplifier and a frequency responsive network for providing an output potential varying as a predetermined function of the speed of rotation of said cutting tool.

11. Machine tool apparatus comprising a rotary tool, means for rotating said tool about a predetermined axis of rotation, a thermally expansive feed-control member fixedly positioned at one point and connected at another point thereof to said rotary tool, said thermally expansive member being so arranged that the axial feed depth of said tool is dependent upon the dimensions of said member between said fixed point and said connection point, means for varying the temperature of said member intermediate said fixed point and said connection point whereby the axial feed of said rotary tool is controlled accordingly, and means responsive to changes of speed of rotation of said tool for varying the temperature of said member gradually in such a manner as to suppress said speed changes.

SIGURD F. VARIAN.

REFERENCES CITED

The following references are of record in the file of this patent:

UNITED STATES PATENTS

| Number | Name | Date |
|---|---|---|
| 1,911,138 | Clute et al. | May 23, 1933 |
| 2,178,448 | Indge | Oct. 31, 1939 |
| 2,327,811 | McRae | Aug. 24, 1943 |
| 2,161,256 | Karcher | June 6, 1939 |

FOREIGN PATENTS

| Number | Country | Date |
|---|---|---|
| 354,635 | Great Britain | Aug. 13, 1931 |

OTHER REFERENCES

Vibration Protection for Rotating Machinery, by Webb and Murrey; pages 534 to 537, vol. 63 of Electrical Engineering, July 1944.